April 9, 1963  R. S. DAVIS  3,084,914
CONDENSER FOR RECOVERY OF SUBLIMABLE MATERIALS
Filed June 23, 1958  2 Sheets-Sheet 1
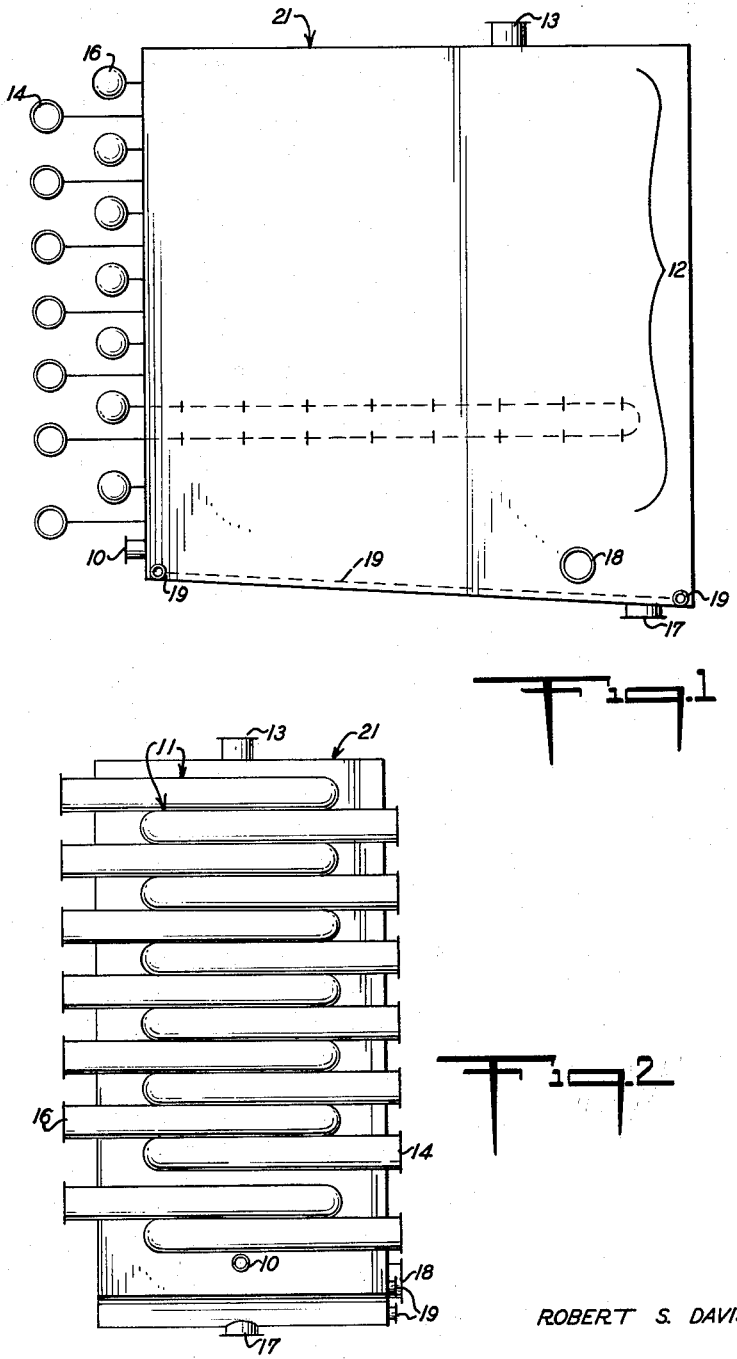
INVENTOR
ROBERT S. DAVIS
BY
ATTORNEY April 9, 1963 R. S. DAVIS 3,084,914
CONDENSER FOR RECOVERY OF SUBLIMABLE MATERIALS
Filed June 23, 1958 2 Sheets-Sheet 2
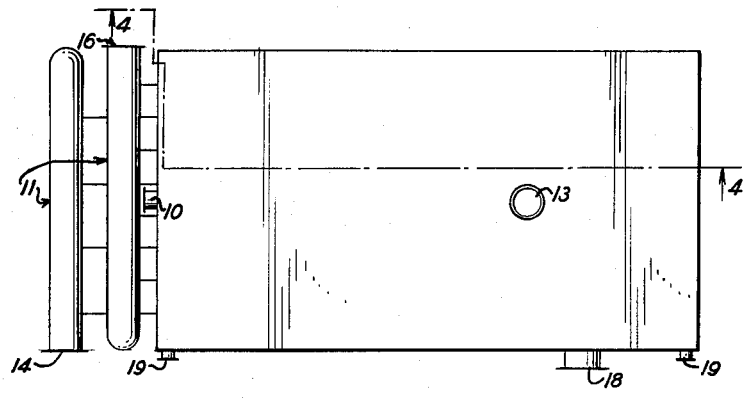
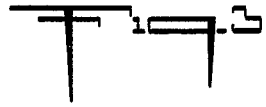
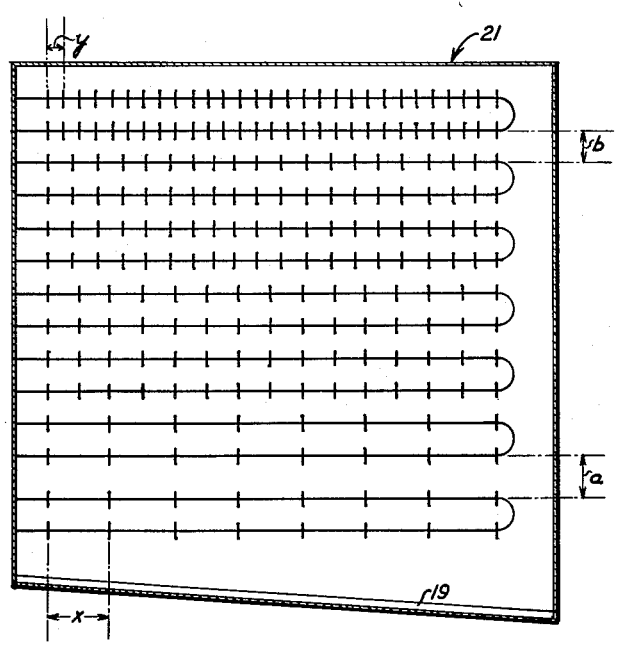
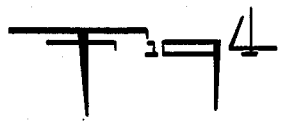
INVENTOR
ROBERT S. DAVIS
BY
ATTORNEY

United States Patent Office 3,084,914
Patented Apr. 9, 1963

3,084,914
CONDENSER FOR RECOVERY OF SUBLIMABLE MATERIALS
Robert S. Davis, New Rochelle, N.Y., assignor to Scientific Design Company, Inc., New York, N.Y., a corporation of Delaware
Filed June 23, 1958, Ser. No. 743,756
5 Claims. (Cl. 165—61)

This invention is broadly concerned with apparatus and processes for the condensation and separation of a sublimable material from a vapor containing said material. More particularly, this invention is concerned with apparatus and processes for the separation and recovery of phthalic anhydride from a vapor. More specifically, this invention is concerned with apparatus containing rows of finned tubes of progressively decreasing fin pitch so disposed that a vapor containing sublimable material when introduced into said apparatus flows along a path of progressively increasing heat and mass transfer surface per unit of flow path area, thereby effecting maximum heat and mass transfer per unit volume.

It is known in the art to separate phthalic anhydride from a vapor by condensing the phthalic anhydride directly to a solid in large chambers known as "haybarn condensers." The phthalic anhydride is usually produced by the oxidation of naphthalene or ortho-xylene. In such processes the gases leaving the reactor contain water vapor which, if allowed to condense, will react with the phthalic anhydride to form phthalic acid, a highly corrosive material with a high melting point. Therefore, stainless steel which offers high resistance to this corrosive acid is generally employed as the material of construction for these large haybarn condensers making equipment costs for this process expensive. The removal of phthalic anhydride solid from the barn is a difficult process and has been performed manually. This method of recovery is further complicated by the possibility of explosion in the barns.

In an improved methotd of phthalic anhydride recovery it has been suggested that by passing vapor containing phthalic anhydride (or other sublimable material) traversely over cooling tubes containing fins, maximum condensation of the solid can be effected. The condensate is then melted by passing heating media through the tubes and the phthalic anhydride is removed as a liquid. This method, however, has been inefficient because of the relatively low heat transfer rates obtained in such apparatus, therefore requiring large and uneconomical surfaces for condensation.

This problem is further aggravated by the reduction in effectiveness of the condenser arising from the obstruction of the flow path of the vapor by the deposited material. Whenever the space between fins of a tube is filled up, the tube loses its effectiveness in heat and mass transfer and shifts the burden of condensation to the subsequent rows. As this deposition of material occurs on a number of tubes, the apparatus becomes more and more ineffective and inefficient and phthalic anhydride is lost in the effluent, thus reducing plant yield and also incurring an explosion hazard as a result of the presence of too great a concentration of phthalic anhydride in the tail gas.

A feature of the present invention is an apparatus which will provide maximum heat and mass transfer per unit volume in a process for the separation of phthalic anhydride by sublimation from a vapor containing phthalic anhydride.

It is another feature of the invention that the apparatus and processes allow only very short duration of high degree subcooling and thus avoid space nucleation or "snowing out," that is, formation of light phthalic anhydride particles in the gas phase which are carried off by the non-condensed vapor.

It is a further feature of the invention to provide optimal flow velocity and wider longitudinal tube spacing to permit a longer condensing cycle before the pressure drop through the condenser becomes too great to permit continued operation of the apparatus.

A preferred embodiment of the invention comprises in an apparatus the combination of a vessel, rows of finned tubes disposed transversely of the axis of flow in said vessel, vapor inlet means to said vessel, vapor outlet means and liquid outlet means from said vessel, cooling and heating means for said finned tubes, the fin pitch progressively decreasing from a maximum at the tube rows nearest said vapor inlet means to a minimum at the tube rows nearest said vapor outlet means.

In another preferred embodiment, the pitch of the fins in said apparatus is uniform along each tube row.

In still another preferred embodiment, the apparatus comprises, in combination, a vessel, rows of finned tubes disposed transversely of the axis of flow in said vessel, vapor inlet means to said vessel, vapor outlet means and liquid outlet means from said vessel, cooling and heating means for said finned tubes, the pitch of the fins progressively decreasing from a maximum at the tube rows nearest said vapor inlet means to a minimum at the tube rows nearest said vapor outlet means, the pitch of the tubes nearest said vapor inlet means being greater than the pitch of the remainder of the tubes in said apparatus and varying progressively along the flow path from the inlet to the outlet.

In still another embodiment of the invention, a vapor containing phthalic anhydride flows along a plurality of paths of progressively increasing heat and mass transfer surface per unit of flow path area at a linear velocity of from about 0.5 to 10 feet per second. Phthalic anhydride is condensed as a solid from said vapor at a temperature of from about 275° F. to 110° F., the solids are melted in a minority of said paths at a temperature of about 350° F. and the resulting liquefied phthalic anhydride is passed to a purification system where substantially pure phthalic anhydride is recovered.

The temperature at which condensation takes place must, of course, be below the sublimation point of phthalic anhydride (276° F.) but should be high enough to prevent condensation of water present in the vapor, in order to prevent the formation of phthalic acid, as previously discussed.

FIGURES 1, 2, 3 and 4 show schematically a side, end, top and cutaway view of an apparatus of the present invention.

FIGURE 2 is an end view of the apparatus of FIGURE 1;

FIGURE 3 is a top view of the apparatus of FIGURE 1; and

FIGURE 4 is a cutaway view of FIGURE 1 along the line 4—4.

Referring to FIGURE 1, vapors enter the condenser 21 through vapor inlet nozzle 10 and pass over rows of finned tubes 12 mounted transversely to the direction of flow of the vapors. Phthalic anhydride condenses upon said tubes and the remaining vapor passes out of the condenser through vapor outlet 13. A coolant is passed through these tubes through inlet 14 to cool the vapor to a temperature at which condensation of phthalic anhydride to a solid will occur. The tubes are preferably connected longitudinally to manifolds 11 corresponding to the tubes in each row. The phthalic anhydride condensate deposits as a solid upon the finned tubes 12, and the middle rows of tubes are arranged with a sufficient decrease in tube fin pitch to provide increased surface so that they are filled at approximately the same time as the rows of tubes first contacted by the vapor upon entry into the condenser. The distribution of condensed solids is therefore maximized throughout the condenser as a result of this feature of the invention.

The last few rows of tubes, that is, those nearest vapor outlet 13 of the condenser, contain a maximum number of finned tubes per inch and therefore have a maximum ratio of surface to shell volume. This feature is employed primarily to reduce the concentration of phthalic anhydride in the exit gas. Therefore, these tubes are used to provide maximum clean-up surface for the condenser.

In a preferred embodiment of the invention, the tube spacing of the front tube rows is relatively wide to avoid the obstruction of the flow path by the deposited material.

The tube fin pitch progressively decreases from a maximum of about 1 inch to a minimum of about 0.05 inch, preferably from a maximum of 0.5 inch to a minimum of about 0.1 inch.

The fin pitch is defined as the horizontal distance between adjacent fins on any tube, or in the case of a helical fin, as the horizontal distance between adjacent peaks of the fin. The tube pitch is defined as the distance from the center of one tube to the center of an adjacent tube.

Referring to FIGURE 4, the fin pitch progressively decreases from a maximum at the tube rows nearest the vapor inlet 10 to a minimum at the tube rows nearest vapor outlet 13, such that "$x$," the fin pitch nearest inlet 10 is greater than "$y$," the fin pitch nearest outlet 13.

The tube pitch of the rows nearest inlet 10 preferably is greater than the tube pitch of the rows nearest outlet 13, such that "$a$" is greater than "$b$."

To remove the phthalic anhydride from the condenser, the coolant, such as water, is periodically shut off and the tubes are heated by steam or other heating media through inlet 14. The phthalic anhydride solid is thereby melted and removed as a liquid for further purification and recovery through liquid outlet nozzle 17. The steam condensate passes out of outlet 16.

In another preferred embodiment, in order to utilize a continuous process, several parallel condensers are operated simultaneously. Thus, when phthalic anhydride is deposited on the tubes of some of the condensers, the cooling means is shut off, the vapor flow is diverted to the remaining condensers, and the heating means is utilized to melt the solids in those condensers where the solids have deposited. Therefore, in effect, at any given time one set of condensers is operating to cool and condense phthalic anhydride and the remaining apparatus are employed to melt and liquefy phthalic anhydride which has deposited out.

In order to reduce operating costs resulting from the necessity to shut down for repairs, the condenser is preferably constructed such that each row of tubes may be pulled out for cleaning and repair without dismantling the remainder of the condenser tubes. Manhole 18 is provided for easy access into the apparatus.

It will be readily apparent to one skilled in the art that the fins may be of any design which results in increasing the surface area of the tubes on which they are arranged.

The fins can be flat plates arranged parallel with each other and at right angles to the axes of the tubes, or cylindrical, or they may be in the form of helices arranged around the tubes.

Where it is desirable, the same fluid (for example an oil) may be used for both heating and cooling by circulating the fluid alternately through heating and cooling systems.

Care must be taken to avoid condensing solids on the inner wall surfaces of the apparatus since such solids would tend to build up and remain unmelted and it is preferable to provide heating coils 19 in the bottom part of the apparatus to prevent this undesirable solid formation.

In view of the foregoing disclosure, variations and modifications thereof will be apparent to one skilled in the art, and it is intended to include within the invention all such variations and modifications except as do not come within the scope of the appended claims.

EXAMPLE 1

Reactor effluent from the vapor phase oxidation of naphthalene is passed through a phthalic anhydride condenser at a rate of 400 lbs./hr. per square foot of frontal area. The frontal area is defined for purposes of this invention as the total cross-sectional area of flow of the vapor. The condenser contains twenty rows of finned tubes of uniform tube pitch having a surface area of approximately 300 square feet per square foot of frontal area. The pitch of the fins on all the tubes in the condenser is uniform. Each tube has five fins per inch of length. The bulk of the phthalic anhydride in the vapor is condensed on the tube fins and the non-condensed gases pass out of the condenser. The condenser is operated over a five-hour cycle and the average loss of phthalic anhydride in the tail gas is found to be 1.75% of the recoverable phthalic anhydride passing into the condenser. The first filling up of a tube row, which causes increased pressure drop through the condenser, is observed to occur after 2 hours and 3 minutes from the start of the operation.

EXAMPLE 2

The vapor phase oxidation of naphthalene is carried out and the reactor effluent is passed into a condenser identical to the one used in Example 1, except that the tube pitch of the front rows of tubes is greater than the pitch of the remainder of the rows, and the fin pitch is progressively varied from two fins per inch at the tube rows nearest the vapor inlet of the condenser to a maximum of ten fins per inch at the tube rows nearest the tail gas outlet. The condenser contains the same number of fins as the unit used in Example 1, so that only the fin pitch and tube pitch have been varied, and the total condenser surface area, frontal flow area, number of tube rows, and consequently total condenser volume, is kept constant. The reactor effluent is passed throuugh the condenser at a rate of 400 lbs./hr. per square foot of frontal area. For a five-hour operating cycle the average tail gas loss is found to be 0.68% of the recoverable phthalic anhydride passing into the condenser. The first filling up of a tube row (other than the widely spaced front tube rows), which causes increased pressure drop through the condenser, occurs after 5 hours and 15 minutes from the start of the operation.

Use of the variable pitch fins, therefore, yields a 61% recovery of the phthalic anhydride which would be lost in the tail gas if the condenser of Example 1, which utilizes a constant fin pitch and tube pitch, were employed.

In order to duplicate the performance of the variable pitch condenser of Example 2 over a 5-hour cycle time using a condenser having a constant fin pitch and tube spacing and the same frontal flow area as the condenser in Example 1, three times the number of tubes in the condenser of Example 1 are required in order to reduce the tail gas loss to 0.68% of the recoverable phthalic anhydride. Consequently, the volume of such a condenser is required to be twice as large as the volume of the condenser used in Example 1, in order to maintain this minimum loss of phthalic anhydride in the tail gas.

EXAMPLE 3

The oxidation of naphthalene is repeated and the reactor effluent is passed into a condenser identical to the one used in Example 2 except that all of the tubes are on a constant tube pitch, as in Example 1. Therefore, in the present example variable fin pitch is employed in a condenser having a uniform tube pitch.

The first filling up of a tube row which causes increased pressure drop through the condenser occurs after 3 hours and 53 minutes from the start of the operation. The average tail gas loss is found to be 0.67% of the recoverable phthalic anhydride passing into the condenser.

EXAMPLE 4

The oxidation of naphthalene is repeated and the reactor effluent is passed into a condenser identical to the one used in Example 1 except that the tube pitch of the front rows of tubes is greater than the pitch of the remainder of the rows, as in Example 2. Therefore, in the present example constant fin pitch is employed in a condenser having a variable tube pitch.

The first filling up of a tube row (other than the widely spaced front tube rows), which causes increased pressure drop through the condenser, occurs after 3 hours and 48 minutes from the start of the operation. The average tail gas loss is found to be 1.77% of the recoverable phthalic anhydride passing into the condenser.

The following table shows a comparison of the average tail gas losses and time of first filling up of a tube row for each of the condensers used in Examples 1 through 4.

*Table I*

|  | Example 1 | Example 2 | Example 3 | Example 4 |
|---|---|---|---|---|
| Fin pitch | Uniform | Variable | Variable | Uniform. |
| Tube pitch | Uniform | Variable | Uniform | Variable. |
| Time for first filling up of a tube row which causes increased pressure drop through the condenser. | 2 hrs. and 3 mins. | 5 hrs. and 15 mins. | 3 hrs. and 53 mins. | 3 hrs. and 48 mins. |
| Average tail gas loss of recoverable phthalic anhydride. | 1.75% | 0.68% | 0.67% | 1.77%. |

Examination of this table shows that a substantial decrease in the loss of recoverable phthalic anhydride is effected by utilizing variable fin pitches as embodied in Examples 2 and 3. Thus, utilization of variable fin and tube pitches in the condenser (Example 2) effects a 61% recovery of the phthalic anhydride lost in the tail gas, as shown in Example 1, and permits an increase in the operating cycle time of the condenser of 256%.

Example 3, which also utilizes the invention by maintaining the variable fin pitch of Example 2, is provided to show the improvement in cycle time of operation which is achieved by combining a variable tube pitch with the variable fin pitch. Thus, the cycle time of operation in Example 2 is 135% greater than the cycle time employed in Example 3, since utilizing a variable tube pitch as in Example 2 delays the time for the first filling up of a tube row, compared to Example 3 which maintains a uniform tube pitch.

Example 4 is provided to show that if the variable fin pitch is not employed in the apparatus, merely varying the tube pitch will increase the cycle time compared to Example 1 which employs a uniform tube pitch, but will not effect any decrease in the loss of recoverable phthalic anhydride in the tail gas.

It is evident from the data supplied in Table I that utilization of a variable fin pitch in the condenser effects substantial reductions in the tail gas loss of phthalic anhydride, and if this feature is combined with a variable tube spacing, the cycle time of condenser operation is substantially increased.

What is claimed is:

1. An apparatus for the condensation of sublimable material, wherein obstruction of the flow path by deposited material is minimized comprising in combination a vessel, rows of finned tubes disposed transversely of the axis of flow in said vessel, vapor inlet means to said vessel, vapor outlet means and liquid outlet means from said vessel, condensing means and alternately applied heating means for said finned tubes, the pitch of the fins progressively decreasing from a maximum at the tube rows nearest said vapor inlet means to a minimum at the tube rows nearest said vapor outlet means, the pitch of the rows containing the finned tubes nearest said vapor inlet means being greater than the pitch of the remainder of the rows in said apparatus, whereby distribution of condensate is maximized throughout the condensing means.

2. The apparatus of claim 1, wherein the pitch of the fins is uniform along each tube row.

3. The apparatus of claim 2 wherein the pitch of the fins progressively decreases from a maximum of about 1.0″ at the tube rows nearest said vapor inlet means to a minimum of about 0.05″ at the tube rows nearest the vapor outlet means.

4. In the apparatus of claim 1, a plurality of vessels similar to said first mentioned vessel, each vessel having corresponding vapor inlet, vapor outlet, liquid outlet condensing means and heating means, said vessels being disposed in parallel connection whereby phthalic anhydride containing vapor is continuously delivered in alternating order to each of said vessels and phthalic anhydride product is continuously removed from each vessel in turn.

5. An apparatus for the recovery of phthalic anhydride from gases containing the same wherein obstruction of the flow path by deposited material is minimized, comprising: a vessel, means for introducing phthalic anhydride containing gases into said vessel, rows of finned tubes in said disposed transversely to the axis of flow of said gases, said finned tubes being adapted for the deposition thereon of solid phthalic anhydride, means for passing a cooling fluid through said finned tubes adapted to cool and condense solid phthalic anhydride from said gases, means for removing gases from said vessel, means for passing a heating fluid through said finned tubes adapted to melt solid phthalic anhydride deposited on said finned tubes, and means for removing liquid phthalic anhydride from said vessel, the pitch of the rows containing the finned tubes nearest the gas inlet means being greater than the pitch of the remainder of the rows in the vessel and the pitch of the fins progressively decreasing from a maximum at the tube rows nearest the gas inlet means to a minimum at the tube rows nearest said gas outlet means, whereby the deposition of solid phthalic anhydride is maximized throughout said rows of finned tubes.

References Cited in the file of this patent

UNITED STATES PATENTS

| 1,006,321 | Watrous | Oct. 17, 1911 |
| 1,524,520 | Junkers | Jan. 27, 1925 |
| 1,919,029 | Lucke | July 18, 1933 |
| 2,046,368 | Conover | July 7, 1936 |
| 2,076,033 | Kniskern | Apr. 6, 1937 |
| 2,219,333 | Rogers | Oct. 29, 1940 |
| 2,692,657 | Barton | Oct. 26, 1954 |

FOREIGN PATENTS

| 751,352 | Great Britain | June 27, 1956 |